S. M. BEERY.
REVERSIBLE WHEEL RIM.
APPLICATION FILED FEB. 3, 1916.
1,252,077.
Patented Jan. 1, 1918.
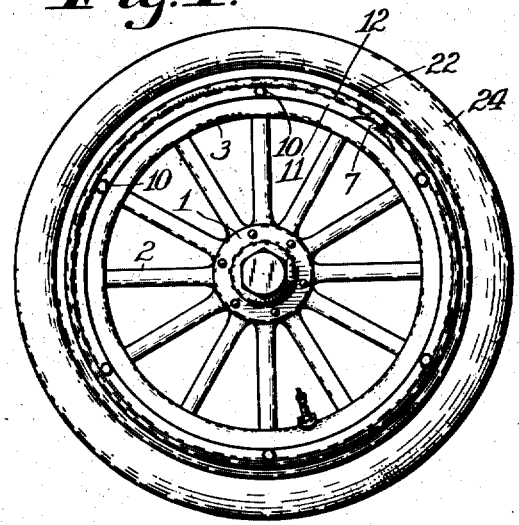
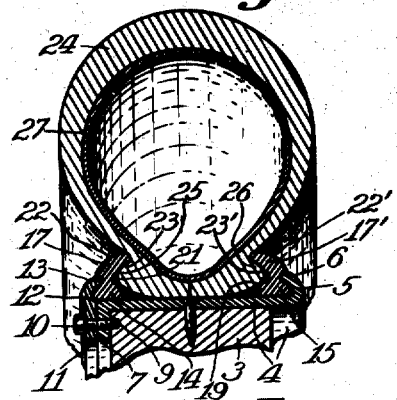
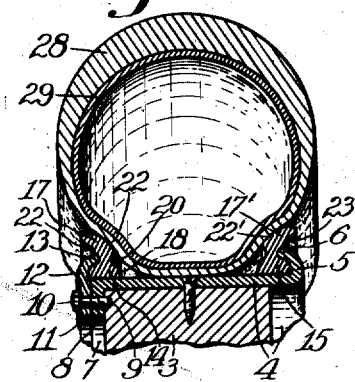
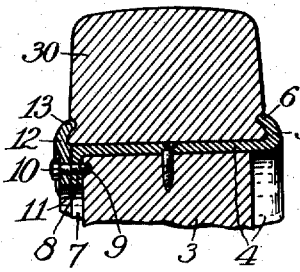
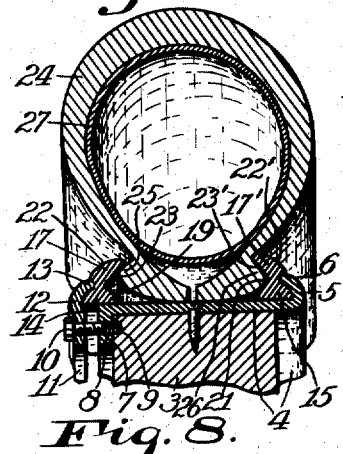
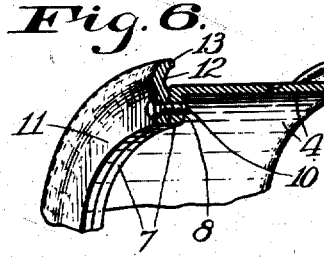
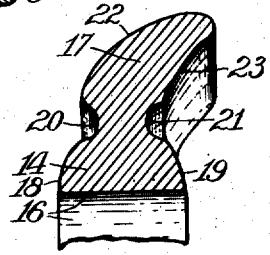
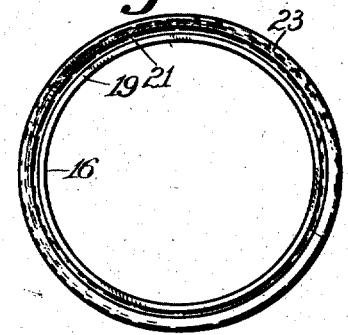
WITNESSES:
J. H. Gardner
M. E. Sparrow
INVENTOR:
Samuel M. Beery,
BY
E. F. Silvius.
ATTORNEY.

UNITED STATES PATENT OFFICE.

SAMUEL M. BEERY, OF EAGLE TOWNSHIP, BOONE COUNTY, INDIANA, ASSIGNOR TO TILFORD A. MERRIMAN AND EDDIE E. MERRIMAN, BOTH OF BROWN TOWNSHIP, INDIANA.

REVERSIBLE WHEEL-RIM.

1,252,077.      Specification of Letters Patent.      Patented Jan. 1, 1918.

Application filed February 3, 1916. Serial No. 76,045.

*To all whom it may concern:*

Be it known that I, SAMUEL M. BEERY, a citizen of the United States, residing in Eagle Township, in the county of Boone and State of Indiana, have invented a new and useful Reversible Wheel-Rim, of which the following is a specification, reference being had to the accompanying drawings, and to the letters and figures of reference marked thereon.

This invention relates to rims of vehicle wheels that are designed to be equipped with resilient tires, either pneumatic or non-inflatable tires, the invention having reference more particularly to a rim that is adaptable to be used in either automobile wheel or motorcycle wheel construction and to be equipped with either a clencher-tire, a plain pneumatic tire of either the single-tube or double-tube type, or with a rubber cushion tire, as may be preferred or most available in emergency.

An object of the invention is to provide an adjustable wheel-rim of the above-mentioned character that shall be so constructed as to be adaptable for being equipped with various types of tires, in order that the expense of changing wheel-rims may be avoided in case a different type of tire is desired from that with which the wheel was originally equipped.

Another object is to provide a wheel rim that shall be so constructed as to be capable of being adjusted to conform to the construction of any of the various types of tires in common use, in order that in case of a destructive accident to a tire any one of the different types of tires obtainable in emergency may be quickly substituted for the damaged tire.

A still further object is to provide an improved wheel rim of the above-mentioned character which shall be simple and not liable to derangement, and which may be manufactured at moderate cost and be durable and economical in use.

With the above-mentioned and other objects in view, the invention consists in a wheel-rim having certain novel features of construction, and including reversible and interchangeable continuous clencher-rings of novel construction; the invention consisting further in the parts, and combinations and arrangements of parts, as hereinafter particularly described and further defined in the accompanying claim.

Referring to the drawings, Figure 1 is a front view of one type of automobile wheel provided with the improved wheel-rim and a pneumatic tire of the clencher type; Fig. 2 is a transverse section of the wheel-rim and the tire; Fig. 3 is a transverse section of the improved wheel-rim and a pneumatic tire thereon of the plain double-tube type, the wheel-rim being adjusted to suit the tire; Fig. 4 is a transverse section of the wheel-rim minus the clencher-rings and provided with a plain cushion tire; Fig. 5 is a transverse section of the improved wheel-rim and the pneumatic clencher-tire thereon and illustrating one of the functions of the improvement for drawing the tire casing into place on the wheel-rim; Fig. 6 is a fragmentary perspective view of the improved wheel-rim minus the clencher-rings thereon; Fig. 7 is a fragmentary transverse section of the improved reversible and interchangeable clencher-rings; and, Fig. 8 is a plan view of the clencher-ring.

Similar reference characters on the various figures of the drawings indicate corresponding elements or features of construction herein referred to.

In the drawings one type of automobile wheel is illustrated for descriptive purposes, the same comprising a hub 1, spokes 2, and a felly 3 on which the improved wheel-rim is suitably secured, and it should be understood that in case the wire-spoke type of wheel is preferred the wheel-rim may be suitably connected to the wire spokes, as in common practice.

The improved wheel-rim comprises a cylindrical band or main part 4 having a straight-face periphery, one edge of the band having a peripheral flange 5 thereon that has an in-turned gripper portion 6. The opposite edge of the band has an inwardly extending flange 7 thereon in which are a suitable number of screw-threaded holes 8, opposite to which the felly 3 has recesses 9, when the wheel-rim is applied to a felly, to receive the ends of bolts or capscrews 10 that are fitted into the screwthreaded holes for securing an annular clamp plate 11 to the flange 7. The clamp plate has a retaining-ring 12 on its outer edge that conforms in cross-section to the flange 5 but in normal position is in reverse order thereto, and it has a gripper portion 13 that is curved over toward the gripper portion 6. The clencher portions 6 and 13 are capable of securing a cushion tire to the wheel-rim or main portion 4 thereof.

Two reversible and interchangeable rings are provided that are adaptable for clencher-rings to secure a clencher-tire to the band or main part 4, or to be adjusted to constitute substantial continuation of the flange 5 and the retaining-ring 12 so as to form substantial non-rim-cutting flanges for retaining a non-clencher type of tire on the main portion 4. The rings are identically alike in structure, the rings having base portions 14 and 15 respectively, each base portion having a straight bore 16 that is slidingly fitted closely over the exterior of the band or main part 4, the rings having flaring engagement portions 17 and 17' that extend from the base portions respectively. One side of each base portion has a convex face 18, the opposite side having a similar convex face 19, each face conforming to the inner face of the flange 5 and the retaining-ring 12. Beyond the convex faces each ring has an annular groove 20 in one side and a similar groove 21 in the opposite side thereof, each groove being designed to receive either the gripper portion 6 or the gripper portion 13, the various peculiarities of the ring being most clearly seen in Fig. 7. The rings being assembled on the band 4 the flaring portions 17 and 17' have oppositely disposed convex faces 22 and 22' respectively to support and retain a plain tire, the flaring portions having also concave faces 23 and 23' for engaging clencher tires. When the rings are reversed so that the concave faces 23 and 23' are presented each toward the other the rings are adapted to retain a tire casing 24 having clencher-ribs 25 and 26, the casing having an air-tube 27 therein. When the rings are reversed or transposed so that the convex faces 22 and 22' are presented inwardly, the rings are adapted to retain a non-clencher or plain tube or tire 28 which, when designed as a double-tube pneumatic tire contains an air-tube 29. In some cases the rings are removed from the band or main part 4 and a cushion tire 30 is placed on the latter and gripped by the gripper portions 6 and 13 of the flange 5 and the retaining-ring 12 respectively.

When applying the clencher-tire casing 24 the ring 15 is properly adjusted against the flange 5, the clamp plate 11 disconnected from the flange 7, and the ring 14 removed from the band 4, after which the tire in deflated condition is slipped over the band and one clencher-rib 26 brought to proper position against the face 23'. The tire casing being stiff and requiring force to bring the two edges thereof together, the operation is expedited by placing the ring 14 against the rib 25 and pushing on the ring until it is partially on the main part 4 with the face 23 in engagement with the rib 25. The screw bolts 10 being inserted through the clamp plate 11 and into the holes 8 are turned to force the clamp plate toward and finally to the flange 7 against which it is rigidly secured, the operation forcing the disconnected edge of the casing over to the opposite edge and permitting it to become properly seated on the band 4 as the rib 25 slides inwardly against the concave face 23 of the inwardly flaring portion 17. When the non-clencher or plain tire is mounted on the wheel-rim the convex faces 22 and 22', which have liberal width, support the sides of the tire without tending to wear away the exterior of the tire.

In practical use the rings 14 and 15 are forced apart to the flange 5 and the retaining-ring 12 by the air-pressure in the tire, or by the substance of the tire if solid, or provided with means for holding clencher-ribs in contact with the rings. The retaining-ring 12 and adjacent ring are readily removed from place when it is desired or necessary to remove a tire.

Having thus described the invention, what is claimed as new is—

In a reversible wheel-rim, the combination with an annular main part and an outwardly-extending flange on one edge portion and an inward-extending flange on the opposite edge portion thereof, said outwardly-extending flange having a gripper portion, and an annular clamp plate continuously engaging and secured to said inward-extending flange and having a continuous gripper portion, of a pair of improved clencher-rings on said main part, each clencher-ring being continuous and comprising a base portion with a bore of uniform diameter, said base portion having two convex faces on opposite sides respectively thereof extending from said bore, the convex faces being uniform in contour, each of the two opposite sides of the clencher-ring having an annular groove therein, said grooves being uniform in contour to receive either one of said gripper portions, said clencher-ring having a flaring portion extending outward beyond said grooves that is relatively thicker transversely than the portion between the grooves and has a convex face on one side and a concave face on the opposite side thereof, the circumferential portion of said thicker portion being relatively thinner transversely than the body of the flaring portion.

In testimony whereof I affix my signature in presence of two witnesses.

SAMUEL M. BEERY.

Witnesses:
E. T. SILVIUS,
M. E. SPARROW.

Copies of this patent may be obtained for five cents each, by addressing the "Commissioner of Patents, Washington, D. C."